US009517895B2

(12) United States Patent
Bacalia et al.

(10) Patent No.: US 9,517,895 B2
(45) Date of Patent: Dec. 13, 2016

(54) VEHICLE FRAME TURNOVER SYSTEM AND METHOD

(71) Applicant: GM GLOBAL TECHNOLOGY OPERATIONS LLC, Detroit, MI (US)

(72) Inventors: Christopher E. Bacalia, Warren, MI (US); John M. Lux, Brighton, MI (US); Andrew J. Buckland, Clarkston, MI (US); Theodore R. Burton, Shelby Township, MI (US); Douglas M. Linn, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 224 days.

(21) Appl. No.: 14/067,126

(22) Filed: Oct. 30, 2013

(65) Prior Publication Data

US 2015/0118003 A1  Apr. 30, 2015

(51) Int. Cl.
| | |
|---|---|
| H01L 21/68 | (2006.01) |
| B65G 47/248 | (2006.01) |
| B25J 9/00 | (2006.01) |
| B25J 9/16 | (2006.01) |
| B25J 15/00 | (2006.01) |

(52) U.S. Cl.
CPC ............ *B65G 47/248* (2013.01); *B25J 9/00* (2013.01); *B25J 9/0084* (2013.01); *B25J 9/1682* (2013.01); *B25J 15/009* (2013.01); *G05B 2219/39109* (2013.01); *G05B 2219/39124* (2013.01); *Y10S 901/31* (2013.01)

(58) Field of Classification Search
CPC ......... B65G 47/248; B25J 9/00; B25J 9/0084; B25J 9/1682; B25J 15/009

USPC . 414/758, 771, 783, 816; 294/902; 269/257, 266, 270, 271
See application file for complete search history.

(56) References Cited

U.S. PATENT DOCUMENTS

| | | | | | |
|---|---|---|---|---|---|
| 2,390,293 | A | * | 12/1945 | Colson | B66C 1/66 212/332 |
| 3,905,495 | A | * | 9/1975 | Wayne | B65G 47/61 198/409 |
| 3,906,607 | A | * | 9/1975 | Gusev | B23P 19/12 269/266 |
| 4,163,183 | A | * | 7/1979 | Engelberger | B23P 21/002 318/568.13 |
| 4,238,169 | A | * | 12/1980 | DePriester | B66C 1/447 294/103.1 |

(Continued)

*Primary Examiner* — Michael McCullough
*Assistant Examiner* — Lynn Schwenning
(74) *Attorney, Agent, or Firm* — Quinn Law Group PLLC

(57) ABSTRACT

A system for turning over a vehicle frame defining openings and having a longitudinal center axis includes first and second robots each having an end effector. Each end effector has a pair of oppositely-positioned locator pins, at least one of which is selectively moveable toward the other. A controller is used to control the positioning of the frame via the robots and end effector by executing method instructions to cause the robots to align the locator pins of the end effectors with the openings of the frame, and to insert the aligned locator pins into the openings toward the center axis from outside of the vehicle frame. The robots lift the frame from a first conveyor, with weight of the vehicle frame born by the locator pins during the lift. The robots also rotate the frame about the center axis and lower the vehicle frame onto a second conveyor.

20 Claims, 3 Drawing Sheets

(56) References Cited

U.S. PATENT DOCUMENTS

| | | | | |
|---|---|---|---|---|
| 4,496,275 | A * | 1/1985 | Harp | B65G 65/23 |
| | | | | 294/68.26 |
| 4,583,902 | A * | 4/1986 | Riley | B60P 1/04 |
| | | | | 294/119.1 |
| 5,036,967 | A * | 8/1991 | Graber et al. | B65H 67/068 |
| | | | | 198/468.2 |
| 5,096,365 | A * | 3/1992 | Ford | B66F 9/18 |
| | | | | 414/607 |
| 5,230,599 | A * | 7/1993 | Orr | B66F 9/18 |
| | | | | 212/243 |
| 5,416,706 | A * | 5/1995 | Hagenbuch | G08G 1/20 |
| | | | | 177/136 |
| 5,924,545 | A * | 7/1999 | Crorey | B23Q 1/52 |
| | | | | 198/375 |
| 6,588,816 | B1 * | 7/2003 | Moilanen et al. | B25B 5/087 |
| | | | | 269/279 |
| 6,662,083 | B2 * | 12/2003 | Angel | B23K 37/047 |
| | | | | 29/430 |
| 6,708,393 | B1 * | 3/2004 | Roy | B62D 65/06 |
| | | | | 269/21 |
| 7,798,316 | B2 | 9/2010 | Powers et al. | |
| 8,226,140 | B1 * | 7/2012 | Dietrich et al. | B66C 1/107 |
| | | | | 294/119.1 |
| 2001/0047591 | A1 * | 12/2001 | Yamaoka | B23K 37/0426 |
| | | | | 29/897.2 |
| 2002/0198618 | A1 * | 12/2002 | Madden | B62D 65/02 |
| | | | | 700/101 |
| 2005/0260054 | A1 * | 11/2005 | Bederke | B65D 90/0013 |
| | | | | 410/31 |
| 2006/0210388 | A1 | 9/2006 | Giaier et al. | |
| 2008/0000069 | A1 * | 1/2008 | Savoy | B62D 65/02 |
| | | | | 29/430 |
| 2008/0092391 | A1 * | 4/2008 | Jin | B62D 65/04 |
| | | | | 29/897.2 |
| 2011/0160905 | A1 * | 6/2011 | Asamizu | B25J 15/0019 |
| | | | | 700/258 |
| 2011/0265301 | A1 * | 11/2011 | Kilibarda | B23K 37/047 |
| | | | | 29/407.01 |

* cited by examiner

VEHICLE FRAME TURNOVER SYSTEM AND METHOD

TECHNICAL FIELD

The present disclosure relates to a vehicle frame turnover system and method.

BACKGROUND

The term "body-on-frame" is commonly used in automotive manufacturing to describe a particular vehicle configuration in which a vehicle body is mounted to a separate chassis frame. While modern passenger cars tend to have a unibody or monocoque construction, the use of body-on-frame construction remains common in the manufacturing of trucks and cargo vans. In such vehicles, the use of welded steel beams or rails in forming the vehicle frame provides a relatively durable design with improved towing capacity and increased payload size.

To build a body-on-frame vehicle, a vehicle frame is typically conveyed along an assembly line in an inverted position as underlying chassis components are installed, such as suspension components, brake lines, and the like. The partially assembled chassis is turned over from the inverted position into an upright position to facilitate installation of the engine, transmission, and other powertrain components. A vehicle body is ultimately mated with the assembled chassis farther along the assembly line, such as by lowering the assembled body onto the fully assembled chassis via an overhead crane.

SUMMARY

A vehicle frame turnover system is disclosed herein, along with an associated method of using the same. The system and method may be used in the automated manufacture of body-on-frame vehicles of the type noted above. The turnover system includes a pair of multi-axis assembly robots and a central controller, all of which are positioned with respect to a pair of frame conveyors, e.g., in a manufacturing work cell. One frame conveyor transports an inverted vehicle frame into the work cell via a moveable frame carrier, i.e., a "pre-turnover" carrier, while the other frame conveyor transports the vehicle frame out of the work cell once the frame has been turned over or flipped. The second carrier is therefore referred to herein in the alternative as a "post-turnover" carrier. While the vehicle frame is present within the work cell, the two robots, via control commands from the controller, selectively align with and grasp the inverted frame from both ends/all four corners of the vehicle frame, doing so from the outside of the frame using a product-compliant end effector. The robots then cooperate to lift the vehicle frame from the pre-turnover carrier, turn over/flip the frame 180 degrees with respect to a longitudinal axis of the vehicle frame so that the frame is in an upright position, and then deposit the upright frame onto the post-turnover carrier.

While frame turnover processes in general are commonly employed in vehicle manufacturing plants for body-on-frame construction, the present approach differs from conventional approaches in a variety of ways. One such way is via the use of the product compliant end effectors noted briefly above. As used herein, the term "product compliant" refers to a particular structural configuration providing ability to use the same tool setup, i.e., the same robots and controller, in a given assembly line that uses the same or different frame designs. For instance, in a pickup truck assembly line, some vehicle models may have similar front and back end frame designs, but may have an extended cab or truck bed, thereby requiring extended frames and/or additional transverse support rails. The product-compliant end effectors allow the use of multiple chassis having the different frames to be constructed on the same assembly line without having to reconfigure the end effectors, and in such a way as to compensate for variance, within an allowable tolerance, in the construction of frames of the same design.

The product-compliant end effectors may have a transverse member and two longitudinal members, with the longitudinal members extending from and arranged orthogonally with respect to the transverse member. Each end effector in turn has a pair of locator pins, with one locator pin disposed on a free end of a respective one of the longitudinal members. In operation, one end effector may be controlled to grasp the rear of the vehicle frame while the other end effector grasps the front of the frame. The controller transmits motor control commands directly to the various joint motors of the two robots, such that the robots together form one robotic system with two motion groups, as is understood in the art, with all commands originating with the controller.

In response to the motor control commands, the robots move with respect to at least one of their control axes so as to align a given locator pin with openings defined in the lateral/outer sides of the vehicle frame. Once the pins have been properly aligned, the pins are inserted into the openings from the outside-in, i.e., from the outside of the frame toward the center axis of the frame. The robots are then instructed by the controller to lift the frame off of the pre-turnover carrier, turn the frame 180 degrees with respect to its longitudinal center axis, and deposit the upright frame onto the post-turnover carrier.

The use of the locator pins and coordinated control of the multi-axis robots by the controller as disclosed herein is intended to provide a highly product-compliant frame turnover approach, that is, one that is usable with different vehicle frames having some level of product variation between them, such as different frame lengths, manufacturing tolerances, and/or a range of possible assembly components. The product-compliant end effectors described herein may reduce the need for complex, design-specific frame turnover equipment.

Conventional inside-out clamping (grasping the frame by applying force in a direction that is radially outward with respect to the center axis of the frame) or chain-and-hoist approaches may limit manufacturing flexibility due to the wide variation often encountered in chassis designs. That is, it is recognized herein that a wide variation in the inner construction of a given vehicle chassis may exist, with "inner construction" meaning the areas between the outer longitudinal beams of the frame. The present end effectors instead approach the frame from the outside of the frame using the locator pins described herein, thereby simplifying coordinated motion of the two robots. At the same time, the locator pins may be constructed with a plurality of tiers of different sizes or diameters so as to enable use of the same end effectors with multiple frame styles without requiring downtime for retooling.

In an example embodiment, the turnover system may include first and second multi-axis robots having respective first and second end effectors. Each of the end effectors has a pair of oppositely-positioned locator pins, at least one of which is selectively moveable toward the other. A controller of the type noted above is used as part of the system. The controller, which has a processor and tangible, non-transitory memory on which is recorded instructions for positioning the vehicle frame using the first and second end effectors, is in communication with the robots. The controller is configured, i.e., fully equipped in software and hardware, to selectively execute the instructions from memory via the processor to cause the first and second robots to execute the present method.

The method may include automatically aligning the locator pins of the first and second end effectors with various openings defined by the vehicle frame, inserting the aligned locator pins into the openings toward the center axis of the frame from outside of the vehicle frame, and then lifting the vehicle frame from a first conveyor using the robots and the end effectors. The weight of the vehicle frame is born primarily by the locator pins during the lift. The robots then rotate the vehicle frame about the longitudinal axis and lower the vehicle frame onto a second conveyor.

The above features and advantages and other features and advantages of the present invention are readily apparent from the following detailed description of the best modes for carrying out the invention when taken in connection with the accompanying drawings.

DETAILED DESCRIPTION

Figure 1:
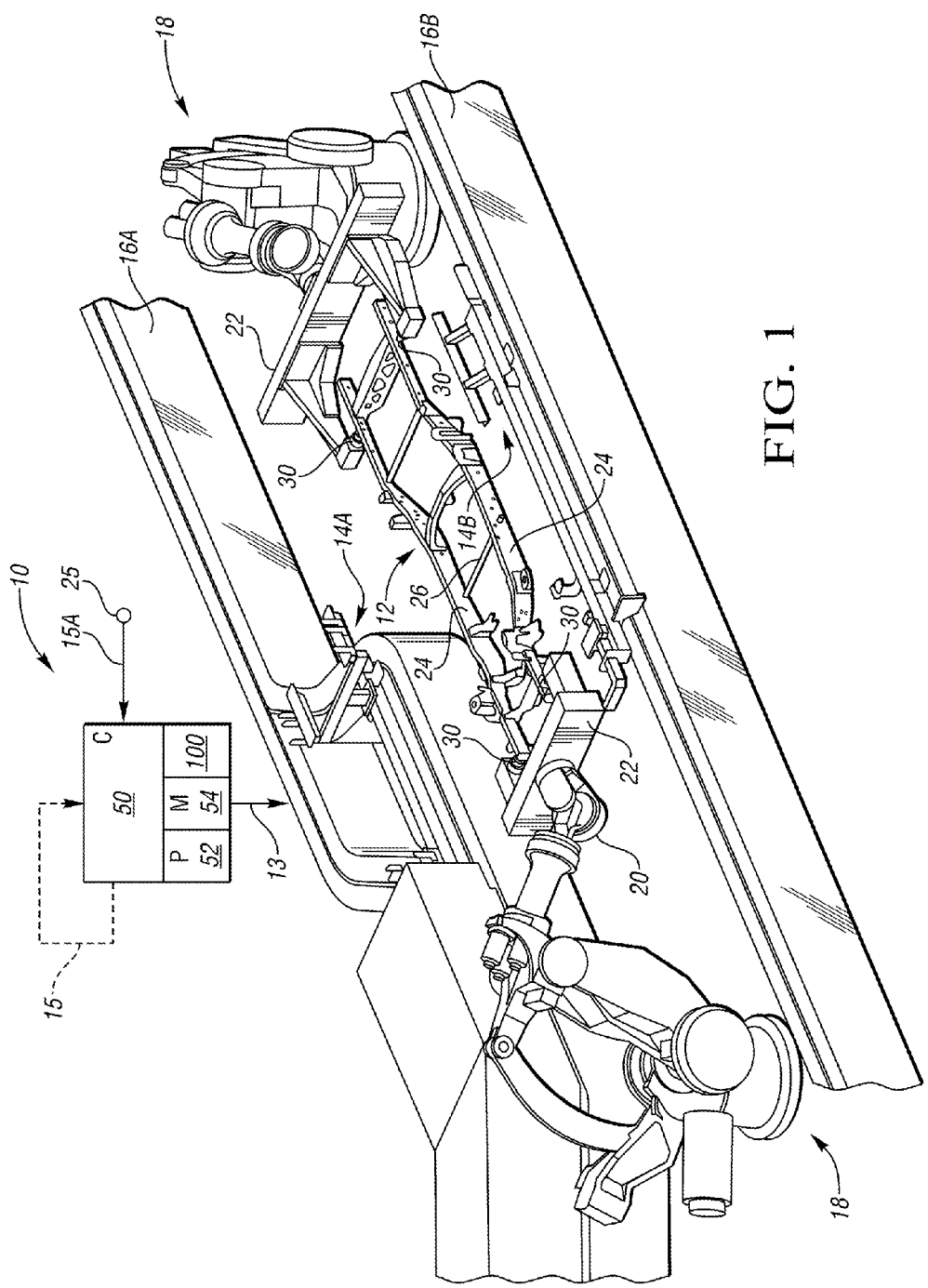
FIG. 1 is a schematic perspective top view illustration of an example manufacturing work cell that uses a vehicle frame turnover system and method as described herein.

Referring to the drawings, wherein like reference numbers refer to like components, a turnover system 10 is shown in FIG. 1. The system 10 may be used as or within a work cell used for the automatic positioning and handling of a vehicle frame 12 during assembly of a chassis for a "body-on-frame" vehicle, e.g., a pickup truck, sport utility vehicle, cargo van, or any other vehicle in which a vehicle body (not shown) is mounted to a separate chassis frame such as the vehicle frame 12.

Specifically, the vehicle frame 12 may be transported via a first carrier 14A, which is referred to as a pre-turnover carrier, via a first conveyor 16A. The vehicle frame 12 may arrive in the work cell in an inverted position after prior installation of undercarriage components, such as brake lines and suspension system components. Such previously-installed components are omitted from FIG. 1 for illustrative simplicity. The vehicle frame 12 is then rotated or flipped 180 degrees with respect to a longitudinal center axis 11 (see FIG. 2) of the vehicle frame 12 such that the vehicle frame 12 is upright, i.e., "roadside up", and positioned on a second carrier 14B (post-turnover carrier) of a second conveyor 14B.

The respective first and second conveyors 16A and 16B may be any device or system which is operable to move the vehicle frame 12 to and from the turnover work cell, i.e., into proximity of the system 10, such as a belt and roller, overhead monorail, chain and crossbar, wicket-type conveyor, etc. To facilitate manufacturing, the respective first and second conveyors 16A and 16B may be positioned parallel to each other as shown such that turnover operations occur between the first and second conveyors 16A, 16B.

To reposition the vehicle frame 12 for assembly of powertrain components such as an engine and transmission (not shown), the system 10 employs a pair of multi-axis robots 18. For instance, the robots 18 may be embodied as conventional six-axis manufacturing robots of the type typically used in a manufacturing environment. Such robots have six motors controlling motion on six axes, and thus provide six control degrees of freedom (DOF). The 6 DOF allow each robot 18 to rotate, extend, retract, and tilt an arm 20. This capability allows each robot 18 to ultimately position a product-compliant end effector 22 that is attached to the arm 20.

The example vehicle frame 12 shown in FIG. 1 includes a pair of longitudinal support rails 24 that are joined together via one or more lateral support rails 26. The different embodiments of the vehicle frame 12 may entail different numbers and/or designs of the longitudinal and lateral support rails 24 and 26, respectively, e.g., with longer vehicle frames 12 requiring additional lateral support.

Figure 2:
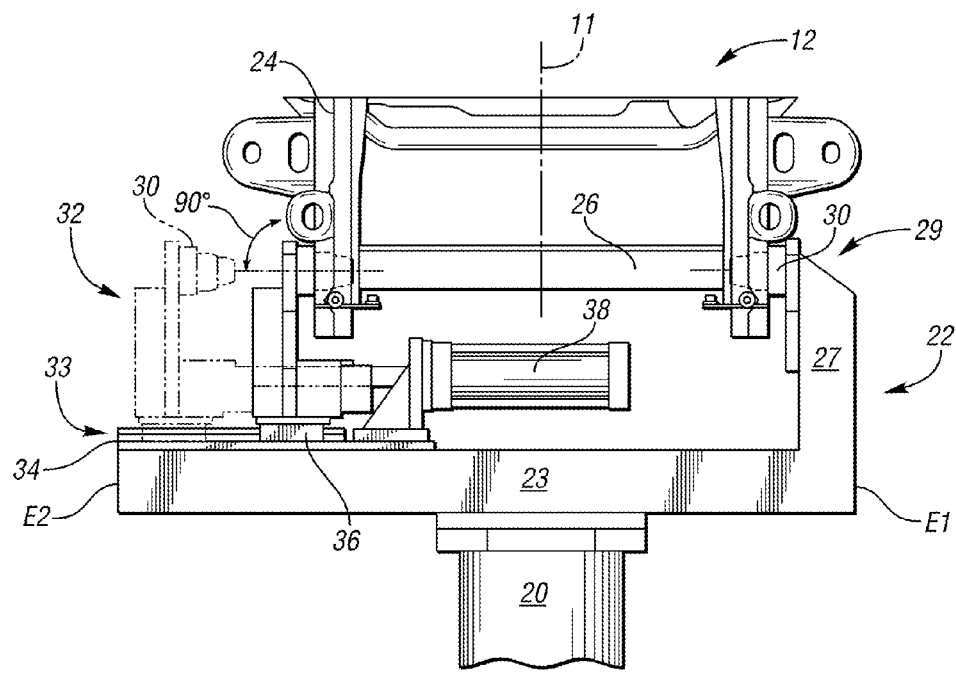
FIG. 2 is a schematic plan view of a portion of an example vehicle frame and a product-compliant end effector usable within the example work cell shown in FIG. 1.
Figure 3:
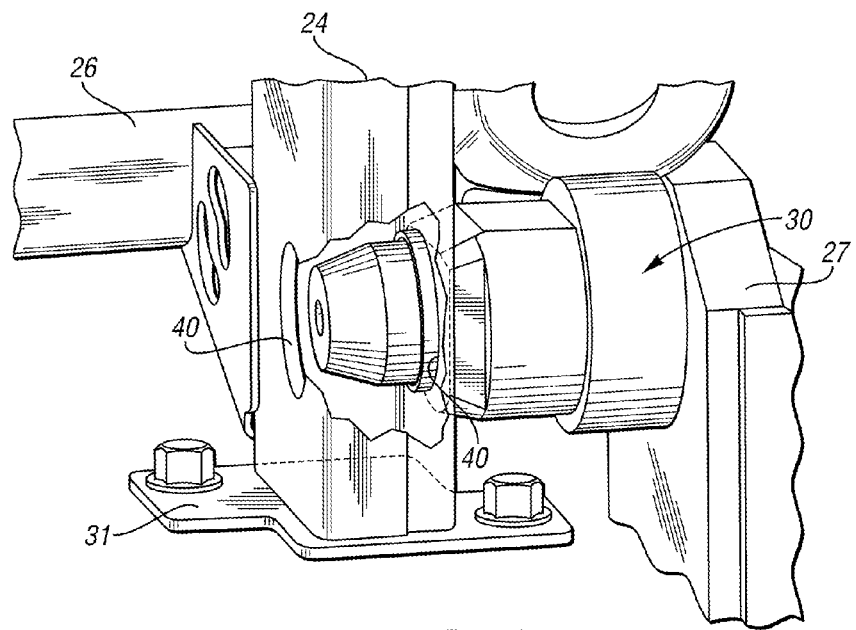
FIG. 3 is schematic perspective side view depicting engagement of an example multi-tiered locator pin usable as part of the end effector shown in FIG. 2.

In all embodiments, the vehicle frame 12 defines various openings 40, as best shown in FIG. 3, in either or both of the respective longitudinal and lateral support rails 24 and 26. The product-compliant end effectors 22 each include a pair of locator pins 30, with the locator pins 30 being inserted into the openings 40 from the outside of the vehicle frame 12 as shown so as to thereby engage the vehicle frame 12. The particular design of the end effectors 22 and the locator pins 30 are described in further detail below with reference to FIGS. 2-4. A method 100 of positioning the frame 12 via the system 10 of FIG. 1 is described below with reference to FIG. 5.

Still referring to FIG. 1, a central controller (C) 50 is communication with the robots 18 over a controller area network (CAN) or other suitable network, which may be either hard wired or wireless. The controller 50 may be embodied as a computer device having a processor (P) 52 and memory (M) 54. Instructions embodying the method 100 are recorded on the memory 54 and are selectively executed by the processor 52 such that the controller 50 is programmed to execute all necessary steps of the method 100. In a possible embodiment, each robot 18 is controlled via motor control signals (arrows 13) in response to input signals (arrows 15) transmitted into or otherwise received by the controller 50.

By networking two 6 DOF robots 18 together, the controller 50 of FIG. 1 acts as a brainstem or master controller for a 12 DOF (12 axis) robotic system, with the 6 DOF of each robot 18 independently controlled by the controller 50 as two different motion groups. The input signals (arrow 15) which drive the control steps executed by the controller 50 may be internally generated by the controller 50, e.g., in the execution of the method 100, and/or may include externally-sensed information such as position or data (arrow 15) from a sensor 25, e.g., a proximity sensor, a vision system, a contactor or switch state, and the like.

The memory 54 may include tangible, non-transitory, computer-readable media such as read only memory (ROM), electrically-programmable read-only memory (EPROM), optical and/or magnetic media, flash memory, etc. Such memory is relatively permanent, and thus may be used to retain values needed for later access by the processor 52. Memory 54 may also include sufficient amounts of transitory memory in the form of random access memory (RAM) or any other non-transitory media. Memory 54 may also include any required position control logic, such as proportional-integral (PI) or proportional-integral-derivative (PID) control logic, one or more high-speed clocks, timers, analog-to-digital (A/D) circuitry, digital-to-analog (D/A) circuitry, a digital signal processor, and the necessary input/output (I/O) devices and other signal conditioning and/or buffer circuitry.

Referring to FIG. 2, a portion of the vehicle frame 12 of FIG. 1 is shown in partially and fully engaged states. The product-compliant end effector 22 in this particular embodiment includes a transverse member 23 and first and second longitudinal members 27, 32, respectively. In the embodiment shown, the first longitudinal member 27 is formed integrally with or rigidly attached to the transverse member 23. The longitudinal member 27 extends orthogonally from one end (E1) of the transverse member 23 toward the vehicle frame 12. One locator pin 30 is disposed at a free end 29 of the first longitudinal member 27 as shown. Thus, the first longitudinal member 27 forms a fixed arm of the end effector 22 that is suitable for aligning with and positioning a given corner of the vehicle frame 12 prior to turning over the vehicle frame 12.

Another end (E2) of the transverse member 23 of the end effector 22 may include a rail 34 defining a slot 33 or other feature that is engaged by a moveable carriage 36. The second longitudinal member 32 is connected to the carriage 36, such that movement of the carriage 36 along the rail 34 occurs in response to a force imparted by an actuator 38, e.g., a pneumatic or hydraulic cylinder, servo device, or the like. That is, the actuator 38 is selectively actuated or fired so as to drive the carriage 36 and the second longitudinal member 32 toward the vehicle frame 12. Motion of the carriage 36 should be substantially perpendicular to the longitudinal center axis 11 once the vehicle frame 12 is properly aligned, i.e., 90 degrees±3 degrees in one embodiment.

Another locator pin 30 is disposed on the second longitudinal member 32 as shown, such that movement of the carriage 36 toward the vehicle frame 12 in response to activation or firing of the actuator 38 ultimately forces the locator pin 30 into direct engagement with the vehicle frame 12, i.e., by driving the locator pin 30 through an opening 40 defined by the longitudinal support rail 24, shown with an end bracket 31, and possibly also in the transverse support rail 26, as best shown in FIG. 3. Thus, the second longitudinal member 32 forms a moveable arm directly opposite the fixed arm formed by the first longitudinal member 27, with the second longitudinal member 32 configured to position another corner of the vehicle frame 12 as needed prior to turnover of the vehicle frame 12 in a subsequent step. While omitted from FIG. 2 for illustrative simplicity, the opposite ends/corners of the vehicle frame 12 are similarly engaged by the product-compliant end effector 22 of the other robot 18 (see FIG. 1). Construction of the robots 18 is thus identical, with certain differences in their control timing and sequencing described below with reference to FIG. 5.

Referring to FIG. 3, the locator pin 30 is shown disposed at the distal end (E1) as in FIG. 2. The remaining description of FIG. 3 as it relates to engagement with the vehicle frame 12 applies as well to the locator pin 30 that is disposed on the first longitudinal member 27 shown in FIG. 2. As shown in phantom, the longitudinal support rail 24 of the vehicle frame 12 defines at least one opening 40, which is circular in the embodiments using the particular multi-tiered design of the locator pin 30 shown in FIGS. 3 and 4.

The longitudinal support rail 24 may be a conventional frame rail that abuts end bracket 31. Any type of rail, beam, tube, or other suitable structural element for the vehicle frame 12 may define the opening 40, including frame members with box/rectangular-shaped cross-sections, or C-shaped, D-shaped, or circular cross-sectional shapes. As in FIG. 2, the opening 40 may extend at least partially into the transverse support rail 26. The transverse support rail 26 may be butt-welded to the longitudinal support rail 24, and thus an area in which such longitudinal and lateral support rails 24 and 26 intersect each other may be an optimal location to form the opening 40.

Figure 4:
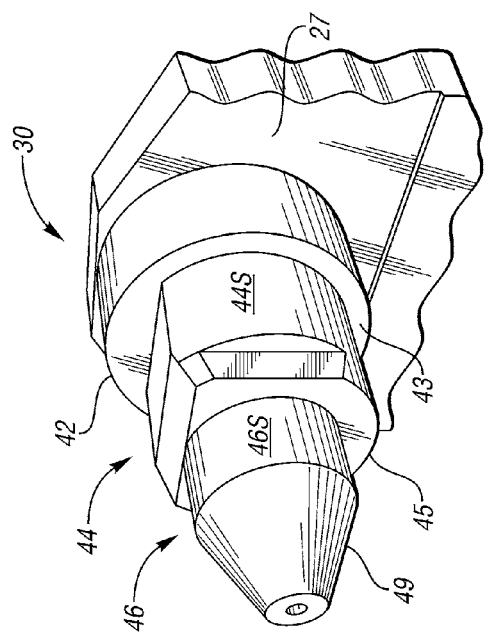
FIG. 4 is a schematic perspective view illustration of the example multi-tiered locator pin shown in FIG. 3.

Referring to FIG. 4, the weight and mass of the vehicle frame 12 of FIGS. 1-3 will be supported by four or more of the locator pins 30 in the turning over of the vehicle frame 12, and thus the locator pins 30 should be machined or otherwise constructed from a suitable high-strength material such as AISI 8620 steel. In an example embodiment, the locator pin 30 may be multi-tiered. That is, the locator pin 30 in this embodiment may include a cylindrical base 42 and a plurality of tiers, e.g., first and second tiers 44 and 46 as shown. The number of tiers in general should equal the number of variations of the opening 40 in the vehicle frame 12. For example, a given assembly line may be used to build pickup trucks of two different lengths. The vehicle frames 12 may therefore differ in length, but each vehicle frame 12 may be constructed with commonly located openings 40 at the front and rear.

In some instances, the diameters of the openings 40 may be different, e.g., with smaller openings 40 used in the shorter vehicle frames 12 and larger openings 40 used in the longer vehicle frames 12. Moreover, in a given batch, the vehicle frame 12 may vary, thus potentially requiring tool change out for each vehicle frame 12. The tiered design of the locator pin 30 solves this problem. While practical limitations may limit the locator pin 30 to two tiers as shown, additional tiers may be used within the scope of the present invention, or the locator pin 30 may have a single tier, e.g., when only one vehicle frame 12 design is used, or where all vehicle frames 12 use the same size opening 40.

In particular, the second tier 46 is configured to enter the opening 40 having the smallest diameter, for instance by forming the second tier 46 as a conical end 49. That is, the locator pin 30 is constructed with knowledge of the sizes of the smallest opening 40 that will be encountered, with the second tier 46 sized to enter the smallest of the openings 40 in the various designs of the vehicle frame 12 of FIGS. 1-3. Second tier 46 may include a tapered outer surface 46S as shown, e.g., with a slight taper of about 5 to 10 degrees. Such a mild taper provides needed compliance to the locator pin 30, which may facilitate use with openings 40 that are slightly off center but within an allowable tolerance. The second tier 46 passes fully into the opening 40 as shown in FIG. 3, and the longitudinal support rail 24 bottoms out against a radial shoulder 45, i.e., a radial surface machined onto the locator pin 30.

For larger diameter openings 40, the locator pin 30 uses the first tier 44. As with the second tier 46, the first tier 44 may have a surface 44S with a slight taper. The diameter of the first tier 44 is slightly less than the diameter of the larger opening 40, such that the longitudinal support rail 24 bottoms out against another shoulder 43, i.e., another radial surface machined onto the locator pin 30, when the locator pin 30 is fully inserted into the opening 40. Thus, if the opening 40 of FIG. 3 were larger than that which is shown, the locator pin 30 would extend farther into the opening 40 of FIG. 3 until the longitudinal support rail 24 contacts the shoulder 43. Additional tiers may be used for other designs, or just one tier may be used, without departing from the intended scope.

Figure 5:
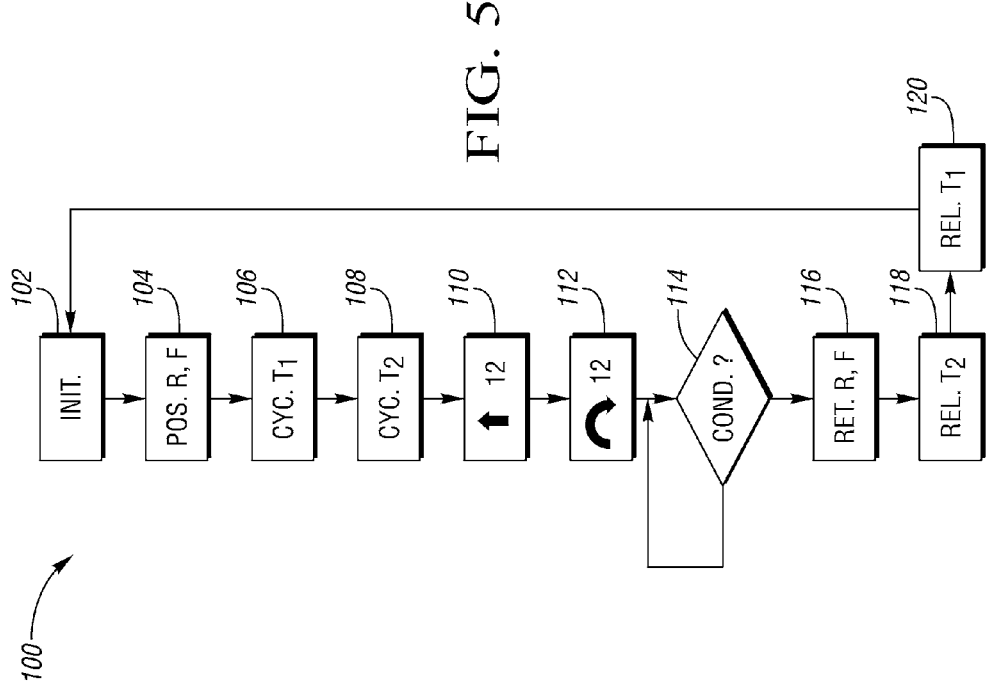
FIG. 5 is a flow chart depicting an example method of turning over a vehicle frame using the system shown in FIGS. 1-4.

Referring to FIG. 5, an example embodiment of a method 100 for turning over the vehicle frame 12 described above commences with step 102 with initialization of the central controller 50 of FIG. 1. In this stage of the method 100, the robots 18 of FIG. 1 are both placed in a default "home" position, i.e., with both product-compliant end effectors 22 open and awaiting arrival of the vehicle frame 12 as the vehicle frame 12 is conveyed via the first conveyor 16A.

As part of step 102, while the vehicle frame 12 approaches the work cell on the first conveyor 16A, frame identification data may be read from the vehicle frame 12 into memory 54 of the controller 50, e.g., via barcode scanning, RFID tagging, and the like. Such data may be used to inform the central controller 50 of the location, size, or other identifying characteristics of the openings 40 in the inbound frame 12, as well as serial numbers, batch numbers, and the like. The first carrier 14A is stopped between the robots 18 of FIG. 1 via commands from the controller 50 and/or a hard stop, limit switch, etc. As a precautionary step, the frame identification data may be read again to ensure that the vehicle frame 12 present in the work cell is correct, e.g., by comparing the data to a production schedule. The method 100 then progresses to step 104.

At step 104, the controller 50 of FIG. 1 pre-stages the robots 18 to a particular location with respect to the respective first and second conveyors 16A and 16B. In other words, rear and front tool positions (POS. R, F) in step 104 are established based on known frame style, type, length, center of gravity, mass, etc. The locations of the openings 40 are known beforehand for each possible design of vehicle frame 12 to be turned over. However, tool positioning in step 104 with respect to the openings 40 may vary with the design of the vehicle frame 12. The method 100 proceeds to step 106.

At step 106, having first positioned the end effectors 22 with respect to the openings 40 at step 104, the controller 50 next cycles the end effector 22 located at the front of the vehicle frame 12, i.e., the first tool, to a first tool position (CYC. T1). This entails aligning the locator pin 30 of the first longitudinal member 27 of FIGS. 2 and 3 into the opening 40 located on the side of the frame 12 adjacent to the first longitudinal member 27. Step 106 also includes firing the actuator 38 of FIG. 2, such as by discharging a cylinder to release pneumatic or hydraulic pressure, to thereby drive the locator pin 30 disposed on the second longitudinal member 32 of FIG. 2 into the opening 40 located on that side of the vehicle frame 12.

Step 106 may additionally entail aligning the vehicle frame 12 with respect to the first carrier 14A using the end effector 22 at the front of the vehicle frame 12, doing so prior to engaging the end effector 22 at the rear of the vehicle frame 12. Positioning the vehicle frame 12 to a known zero position may help adjust for any movement of the vehicle frame 12 during handling and transportation via the first carrier 14A, which could shift the vehicle frame 12 on the first carrier 14A in some manner. Because in most designs the weight of the vehicle frame 12 will tend to be distributed more to the rear of the vehicle frame 12, it may be easier to move the front of the vehicle frame 12 to help align the vehicle frame 12 on the first carrier 14A. This may occur via transmission of motor control commands to the particular robot 18 used to execute step 106. The method 100 then proceeds to step 108.

Step 108 is identical to step 106, except that the controller 50 of FIG. 1 now cycles the other end effector 22 located at the rear of the vehicle frame 12 to a second tool position (CYC. T2). This, as in step 106, entails aligning the locator pin 30 of the first longitudinal member 27 of the end effector 22 into the opening 40 located on the side of the frame 12 adjacent to the first longitudinal member 27. The actuator 38 of FIG. 2 is fired to thereby drive the locator pin 30 disposed on the second longitudinal member 32 of FIG. 2, i.e., the moveable arm, into the opening 40 located on that side of the frame 12. The method 100 then proceeds to step 110.

At step 110, the robots 18 of FIG. 1 receive the motor control commands 13 of FIG. 1, and in response simultaneously lift and raise the vehicle frame 12 from the first carrier 14A, as indicated by the upwardly directed arrow in FIG. 5. The method 100 proceeds to step 112 once the vehicle frame 12 is clear of the first carrier 14A.

At step 112, the robots 18 receive additional motor control commands 13 from the central controller 50, and in response the robots 18 turn over/flip the vehicle frame 12. Rotation of the vehicle frame 12 occurs until the vehicle frame 12 has been rotated a full 180 degrees with respect to its longitudinal center axis 11, as indicated by the arced downward arrow in FIG. 5. The robots 18 simultaneously move the vehicle frame 12 to a load position above the post-turnover carrier, i.e., the second carrier 14B of FIG. 1. The method 100 proceeds to step 114 once the vehicle frame 12 has been properly positioned with respect to the second carrier 14B.

Step 114 entails determining whether conditions are present so as to determine when to lower the vehicle frame 12 onto the second carrier 14B. Conditions may include verifying that the robots 18, or rather the arms 20 and end effectors 22 of FIG. 1, are in the correct position to load the post-turnover carrier/second carrier 14B, that the frame 12 rotation commanded by the central controller 50 in step 112 is complete, and that the second carrier 14B to be loaded is in fact empty, e.g., via manual confirmation, vision systems, weight sensing, or the like. If all conditions are satisfied, the method 100 proceeds to step 116. Otherwise, the method 100 repeats step 116 until the conditions of this step are satisfied.

At step 116, the robots 18 lower the vehicle frame 12 onto the second carrier 14B, i.e., the post-turnover carrier. The method 100 proceeds to step 118 once the vehicle frame 12 is resting on the second carrier 14B.

At step 118, the method 100 includes releasing the end effector 22 from the openings 40 located at the front of the vehicle frame 12. Release of the end effector 22 may be accomplished via return of the moveable arm, which is the second longitudinal member 32 of FIG. 2, via the actuator 38, or via release of any pressure command used to hold the locator pin 30 in place and an accompanying return spring force. The method 100 then proceeds to step 120, where the same step is performed for the rear of the vehicle frame 12, i.e., release of the second tool (T1), which is the end effector 22 that was originally engaged at step 106. The robots 18 then return to their original home positions as described above with reference to step 102. The post-turnover/second carrier 14B is then released, and can transport the vehicle frame 12 to the next assembly station.

The product-compliant end effectors 22 described above have one additional advantage relative to the prior art designs, i.e., compliance in the area of an emergency stop (E-Stop). An E-Stop may occur when a line operator trips an emergency stop device or an emergency stop sequence is automatically executed, for instance when a line worker crosses a light curtain or other barrier. In such an event, the robots 18 of FIG. 1 and all other equipment are commanded to stop motion as quickly as possible, which is difficult given the mass and inertia of the vehicle frames 12 and robots 18.

Therefore, the present design is intended not only to accommodate variation in the product itself as described above, but also offers compliance to handle any variation caused by stopping the collective momentum and inertia of the combined mass of the robots 18, the vehicle frames 12, and other associated equipment. In such a situation, coordinated motion through the duration of the commanded stopping process may be difficult to maintain. Likewise, the position of the end effectors 20 will shift or change. The compliant design and tiered, outside-in grasping approach of the end effectors 20 described above thus allows absorption of any variation in the relationship of the two robot arms without transmitting excessive forces into the vehicle frame 12. This and other benefits will be readily appreciated by those having ordinary skill in the art.

While the best modes for carrying out the invention have been described in detail, those familiar with the art to which this invention relates will recognize various alternative designs and embodiments for practicing the invention within the scope of the appended claims.

The invention claimed is:

1. A system for turning over a vehicle frame, the vehicle frame having support rails defining a set of openings and having a longitudinal center axis, the system comprising:
    a first multi-axis robot having a first end effector;
    a second multi-axis robot having a second end effector, the first and second end effectors each having a pair of oppositely-positioned locator pins, at least one of which is selectively moveable toward the other, the locator pins each having a plurality of tiers, the tiers each having a different relative diameter, with each of the tiers having a tapered surface, and a first of the tiers having a smallest of the relative diameters and a conical end; and
    a controller having a processor and tangible, non-transitory memory on which is recorded instructions for positioning the vehicle frame using the first and second end effectors, wherein the controller is in communication with the first and second multi-axis robots, and is configured to execute the instructions from the memory via the processor to determine whether the vehicle frame is a first or a second distinct vehicle frame type and to cause the first and second multi-axis robots to:
        align the locator pins of the first and second end effectors with the openings defined by the support rails of the vehicle frame;
        responsive to a determination that the vehicle frame is the first vehicle frame type, insert the aligned locator pins a first distance into the openings toward the center axis from outside of the vehicle frame;
        responsive to a determination that the vehicle frame is the second vehicle frame type, insert the aligned locator pins a second distance into the openings toward the center axis from outside of the vehicle frame, the second distance being distinct from the first distance;
        lift the vehicle frame from a first conveyor using the first and second end effectors, wherein weight of the vehicle frame is supported by the locator pins during the lift;
        rotate the vehicle frame about the longitudinal center axis; and
        lower the vehicle frame onto a second conveyor.

2. The system of claim 1, wherein each of the first and second end effectors includes a respective actuator, and wherein each pair of oppositely-positioned locator pins includes a moveable locator pin that is insertable into one of the openings via a respective one of the actuators.

3. The system of claim 2, wherein the actuators each includes a pneumatic or hydraulic cylinder.

4. The system of claim 2, wherein each of the first and second end effectors includes a pair of longitudinal members extending parallel to the center axis, and a moveable carriage and a slotted rail extending orthogonally with respect to the center axis, wherein the moveable carriages engage and move along a respective one of the slotted rails to thereby insert the moveable locator pin.

5. The system of claim 1, wherein the end effectors each have a transverse member and a pair of longitudinal members arranged orthogonally with respect to the transverse member, and wherein the locator pins extend orthogonally from the respective longitudinal members toward each other.

6. The system of claim 1, wherein a second of the tiers has a largest of the relative diameters and includes at least one flat surface on an outer periphery of the locator pin.

7. The system of claim 1, wherein the first vehicle frame type includes first openings of a first configuration, and the second vehicle frame type includes second openings of a second configuration different from the first configuration, and wherein a configuration of the first tier of each of the locator pins is complementary with the first opening configuration, and a configuration of a second of the tiers of each of the locator pins is complementary with the second opening configuration.

8. The system of claim 1, wherein each of the locator pins includes a first shoulder interposed between the first tier and a second of the tiers, the first shoulder being configured to abut the vehicle frame and thereby limit insertion of only the first tier of the locator pin into the opening.

9. The system of claim 8, wherein each of the locator pins includes a second shoulder adjacent the second tier, the second shoulder being configured to abut the vehicle frame and thereby limit insertion of only the first and second tiers of the locator pin into the opening.

10. The system of claim 1, wherein the aligning the locator pins includes:
    determining a first location of the openings on the support rails responsive to a determination that the vehicle frame is the first vehicle frame type; and
    determining a second location of the openings on the support rails responsive to a determination that the vehicle frame is the second vehicle frame type.

11. The system of claim 1, wherein, prior to the inserting of the locator pins, the controller is further configured to cause the first and second multi-axis robots to:
    move to first predetermined positions responsive to a determination that the vehicle frame is the first vehicle frame type; and
    move to second predetermined positions distinct from the first predetermined positions responsive to a determination that the vehicle frame is the second vehicle frame type.

12. The system of claim 1, wherein, prior to the inserting of the locator pins of the second multi-axis robot, the controller is further configured to cause the first multi-axis robot to insert the locator pins thereof and move the vehicle frame to a predetermined zero position.

13. The system of claim 1, wherein the lowering of the vehicle frame is responsive to the controller confirming that one or more verification conditions are satisfied.

14. A method for turning over an elongated vehicle frame defining openings and having a longitudinal center axis, the vehicle frame being one of a plurality of different vehicle frame types, the method comprising:
- providing a first multi-axis robot having a first end effector and a second multi-axis robot having a second end effector, wherein each of the first and second end effectors has a pair of oppositely-positioned locator pins, at least one of which is selectively moveable toward the other, and wherein each of the locator pins has a plurality of tiers, the tiers each having a different relative diameter, with each of the tiers having a tapered surface, and a first of the tiers having a smallest of the relative diameters and a conical end;
- determining whether the vehicle frame is a first or a second of the different vehicle frame types;
- aligning, via a controller in communication with the multi-axis robots, the locator pins of the first and second end effectors with the openings defined by the vehicle frame;
- inserting the aligned locator pins a first or a second distance into the openings toward the center axis from outside of the vehicle frame responsive to a determination that the vehicle frame is the first or the second vehicle frame type, respectively, the inserting including inserting at least one of the first and second tiers of the aligned locator pins into the opening;
- lifting the vehicle frame from a first conveyor using the first and second end effectors, wherein weight of the vehicle frame is supported by the locator pins during the lift;
- rotating the vehicle frame about the longitudinal center axis via the first and second multi-axis robots in response to motor control commands from the controller; and
- lowering the vehicle frame onto a second conveyor via the first and second multi-axis robots.

15. The method of claim 14, wherein the system includes a pair of actuators and each of the locator pins includes a moveable locator pin, and wherein inserting the moveable locator pin includes activating the actuators.

16. The method of claim 15, wherein the actuators include a pair of pneumatic or hydraulic cylinders, and wherein activating the actuators includes releasing pressure from the pair of pneumatic or hydraulic cylinders.

17. The method of claim 14, wherein inserting the aligned locator pins includes moving one of the locator pins along a slotted rail via a moveable carriage.

18. The method of claim 14, further comprising: aligning the vehicle frame with respect to the first carrier using the first end effector prior to inserting the second end effector.

19. The method of claim 14, further comprising:
- scanning frame identification data into memory of the controller; and
- aligning the locator pins using the scanned frame identification data.

20. A system for turning over a vehicle frame having support rails defining a set of openings and having a longitudinal center axis, the vehicle frame being one of a plurality of different vehicle frame types, the system comprising:
- a first six-axis robot having a first end effector;
- a second six-axis robot having a second end effector, the first and second end effectors each having a pair of oppositely-positioned locator pins, the locator pins each defining a plurality of tiers of different relative diameters with each of the tiers having a tapered surface, and a first of the tiers having a smallest of the relative diameters and forming a conical end, at least one of the pins being selectively moveable toward the other; and
- a controller having a processor and tangible, non-transitory memory on which is recorded instructions for positioning the vehicle frame using the first and second end effectors, wherein the controller is in communication with first and second six-axis robots, and is configured to execute the instructions from the memory via the processor to determine whether the vehicle frame is a first or a second of the different vehicle frame types and to cause the first and second six-axis robots to:
  - align the locator pins of the first and second end effectors with the openings defined by the longitudinal support rails of the vehicle frame;
  - responsive to a determination that the vehicle frame is the first vehicle frame type, insert a fixed one of the aligned locator pins a first distance into a first of the openings toward the center axis from outside of the vehicle frame via movement of the first six-axis robot;
  - responsive to a determination that the vehicle frame is the second vehicle frame type, insert the fixed one of the aligned locator pins a second distance into the first of the openings toward the center axis from outside of the vehicle frame via movement of the first six-axis robot;
  - align the vehicle frame with respect to the first carrier using the first end effector prior to inserting the locator pins of the second end effector;
  - insert a moveable one of the aligned locator pins into a second set of the openings toward the center axis from outside of the vehicle frame via release of pressure from a pneumatic or a hydraulic cylinder;
  - lift the vehicle frame in an inverted position from a first conveyor using the first and second end effectors, wherein weight of the vehicle frame is supported by the locator pins during the lift;
  - rotate the vehicle frame about the longitudinal center axis; and
  - lower the vehicle frame in an upright position onto a second conveyor.

* * * * *